United States Patent Office 2,803,037
Patented Aug. 20, 1957

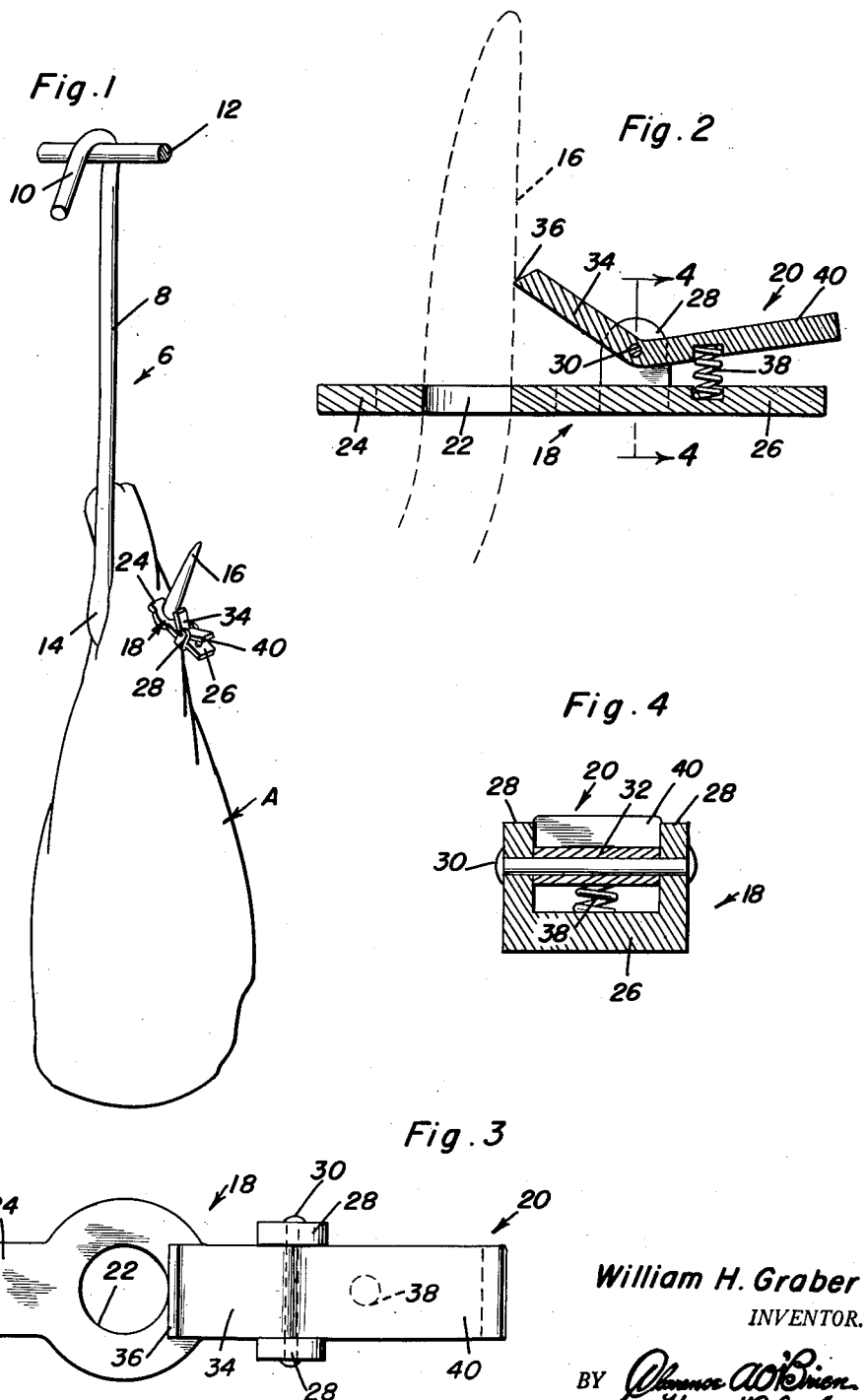

2,803,037

SAFETY DEVICE FOR MEAT HOOK

William H. Graber, Fostoria, Ohio

Application June 9, 1954, Serial No. 435,406

1 Claim. (Cl. 17—44.2)

The present invention relates to a meat hook which is in and of itself substantially conventional in construction and form, and the combination therewith of a readily applicable and removable safety device, a device which is attachable to the bill portion of the hooked end of the meat hook, this in a manner to prevent the meat or other product from becoming accidentally displaced.

There are instances when a chunk or an equivalent piece of meat may become accidentally freed from the conventional type meat hook. This is especially so when meat is suspended on meat hooks in railroad refrigerator cars while in transit. There has long existed a need for a supplemental retainer or safety device and therefore the present invention has been perfected with this idea and safety result in mind.

In carrying out the principles of the invention a highly simple, economical and practical safety device has been adopted and successfully used. It is realized, of course, that placing a safety clasp, clip or similar retainer on the pointed end of a pin, for example, a hat pin or the like is not new. The fact remains, however, that the presence of and knowledge of such prior art devices have nevertheless not solved the meat hook problem. It will be evident therefore that it is an object of the instant invention to solve the stated problem and to do so in a highly practicable and commercially reliable manner.

In carrying out the principles of the invention an apertured member is fitted over the pointed or beak-like end of the hook which is usually called the bill of the hook. This in turn is provided with a spring-pressed lever or catch and the two parts together provide a readily applicable and removable, as well as reliable, safety device.

Novelty is also predicated on the device in the sense that it is an attachable and detachable article of manufacture, which is characterized by a linearly straight apertured member having a mildly V-shaped lever pivoted thereon with a retainer spring cooperating with the lever.

Other objects, features and advantages will become more readily apparent from the following description and the accompanying sheet of illustrative drawings.

In the drawings, wherein like numerals are employed to designate like parts throughout the same, Figure 1 is a perspective view of a meat hook constructed in accordance with the invention and showing a piece of meat suspended thereon and illustrating the safety meat retainer device applied and the manner in which it is constructed;

Figure 2 is an enlarged sectional and elevational view of the safety device by itself;

Figure 3 is a top plan view of the same;

Figure 4 is a cross-section on an enlarged scale taken approximately on the plane of the vertical line 4—4 of Figure 2 looking in the direction of the arrows.

Referring now to the drawings and with special reference to the combination seen in Figure 1 the principal part comprises the meat hook or hanger which is referred to generally by the numeral 6. This is substantially conventional in form and includes a rigid linearly straight shank 8 with the usual blunt hook 10 at the upper end to attach to and be suspended from a supporting rod, bar or the like 12, for example, as found in a refrigeration car or the like (not detailed). The hook for the meat A is denoted by the numeral 14 and here again this is somewhat conventional and has a pointed beak or bill portion 16. This hook pierces the meat and the meat usually hangs thereon but without any means to prevent it from slipping off under certain agitated or motion-promoting circumstances.

The attachable and detachable safety device is a sort of a retainer and is made up of two parts, that is, the bar-like retainer member 18 and the complemental catch 20. The member 18 is a substantially rigid flat faced bar of appropriate length which has an opening 22 therein of suitable diameter to permit the passage of the bill portion 16 of the hook in the manner shown in Figure 2. At one end there is an extension 24 which may be sufficiently long to rest, under ordinary circumstances against the pierced and suspended meat A. There is a relatively long end portion 26 having upstanding spaced parallel ears 28 between its ends with a pivot pin 30 serving to hingedly pivot intermediate bend 32 of the mildly V-shaped lever 20 thereon. That is to say, the bend is between the ears and is joined to the pivot pin and one lateral end portion, the end portion 34 is of an oblique angle and has a tapered knife-like edge 36 which bites into and bears against the bill-portion 16, this under the influence of the coil spring 38 which is interposed between the finger-gripping end portions 40 and 26. Thus, the device may be slipped into place and the catch released and the spring means brings the catch into play to bindingly secure the over-all safety device on the bill portion of the hook. The location of the pivot 30 and the predetermined length of the end portion 34 are cooperatively arranged such that the knife-like edge portion 36 is properly positioned relative to the marginal edge of the hole 22. This arrangement of the parts will bring about the desired gripping of the edge 36 with bill portion 16. As stated, this device when applied will prevent meats from falling off meat hooks in railroad refrigerator cars while in transit. The extended end portion 24 tends to prevent the device from turning to a vertical position and thus minimizes the likelihood of the device being accidentally knocked off of the bill portion 16.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A safety device for removable application to the bill portion of a meathook comprising a solid one-piece linearly straight rigid member generally rectangular in plan and having a single hole of prescribed diameter adjacent one end into and beyond which the usual tapered bill portion of the meathook is adapted to be passed and temporarily lodged and frictionally retained in a manner to connect said member with said bill portion, said member having a coplanar extension projecting beyond said one end and adapted, under certain conditions, to contact and rest firmly against the meat product which is to be pierced by and hung on said hook, a rigid V-shaped lever having its intermediate portion raised above and pivotally mounted on one side of said member between the other end of the member and the adjacent marginal edge of the aforementioned hole, one end portion of said lever being at an oblique angle and having a knife-like free end portion which is confined to a position which is swingable in an arc which is adjacent to and cooperable with said marginal edge of said hole, the opposite end of said lever having an oblique angled finger-piece, and a coil spring interposed between the finger-piece and the adjacent underlying surface portion of said member.

References Cited in the file of this patent

UNITED STATES PATENTS

| | | |
|---|---|---|
| 217,747 | Robertson | July 22, 1879 |
| 626,506 | Sleight | June 6, 1899 |
| 1,040,921 | Fleming | Oct. 8, 1912 |
| 1,093,800 | Petit | Apr. 21, 1914 |
| 1,153,615 | Forsheim et al. | Sept. 14, 1915 |
| 1,185,577 | Balon | May 30, 1916 |
| 1,983,706 | Quirk | Dec. 11, 1934 |
| 2,288,305 | Traumuller | June 30, 1942 |